(12) United States Patent
Levenshteyn et al.

(10) Patent No.: US 8,966,094 B2
(45) Date of Patent: Feb. 24, 2015

(54) MANAGING SESSION DATA OF A COMPOSITE SERVICE SESSION IN A COMMUNICATION NETWORK

(75) Inventors: Roman Levenshteyn, Aachen (DE); Konstantinos Vandikas, Solna (SE); Eugen Freiter, Berlin (DE); Ioannis Fikouras, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 135 days.

(21) Appl. No.: 13/519,646

(22) PCT Filed: Dec. 31, 2009

(86) PCT No.: PCT/EP2009/009346
§ 371 (c)(1),
(2), (4) Date: Sep. 6, 2012

(87) PCT Pub. No.: WO2011/079855
PCT Pub. Date: Jul. 7, 2011

(65) Prior Publication Data
US 2013/0132590 A1      May 23, 2013

(51) Int. Cl.
*H04L 29/06* (2006.01)
*H04L 29/08* (2006.01)
(52) U.S. Cl.
CPC ........ *H04L 65/1066* (2013.01); *H04L 65/1069* (2013.01); *H04L 65/4007* (2013.01); *H04L 67/14* (2013.01); *H04L 67/10* (2013.01); *H04L 67/2838* (2013.01)
USPC ....................................... 709/227

(58) Field of Classification Search
USPC ....................................... 709/227
See application file for complete search history.

(56) References Cited

U.S. PATENT DOCUMENTS

2007/0136448 A1* 6/2007 Da Palma et al. ............. 709/223
2007/0136793 A1* 6/2007 Da Palma et al. ................. 726/5
2010/0094984 A1* 4/2010 Dingler et al. ................ 709/223

FOREIGN PATENT DOCUMENTS

EP       1879358 A1    1/2008
EP       1978758 A1    10/2008

OTHER PUBLICATIONS

Wu et al. "Workflow-based resource allocation to optimize overall performance of composite services." Future Generations Computer Systems, Mar. 1, 2009; pp. 199-212; vol. 25, No. 3; Elsevier Science Publishers; Amsterdam, NL.
Wu et al. "Resource Allocation Based on Workflow for Enhancing the Performance of Composite Service." International Conference on Services Computing; Piscataway, NJ; Jul. 1, 2007; pp. 552-559.

(Continued)

*Primary Examiner* — Tu Nguyen
(74) *Attorney, Agent, or Firm* — Coats & Bennett, PLLC (57) ABSTRACT

The present invention relates to a method for managing session data of a composite service session in a communication network, the composite service session originating from executing a composite service. The method comprises determining (101) a subset of the session data which will likely be used for executing the composite service at a certain execution state of the composite service session, and transmitting (103) the subset of the session data over the communication network towards a certain session node, the certain session node being involved in executing the composite service at the certain execution state.

23 Claims, 4 Drawing Sheets

(56) References Cited

OTHER PUBLICATIONS

Salas et al. "WS-Replication: A Framework for Highly Available Web Services." May 23, 2006; pp. 357-366.

Niemoller et al. "Aspect Orientation for Composite Services in the Telecommunication Domain." Service-Oriented Computing; Nov. 24, 2009; pp. 19-33; Springer-Verlag, Berlin Heidelberg.

* cited by examiner

MANAGING SESSION DATA OF A COMPOSITE SERVICE SESSION IN A COMMUNICATION NETWORK

TECHNICAL FIELD

The present invention pertains to managing composite services in particular in a communication network.

BACKGROUND

One of the emerging communication technologies for delivering multimedia services across fixed and mobile access networks is the IP Multimedia Subsystem (IMS). The network architecture according to IMS comprises a service layer, control and connectivity layers, and an access layer. The control layer comprises call session control functions (CSCFs) forming central nodes for the provision of the SIP signaling (SIP: Session Initiation Protocol). The SIP protocol is one of the core technologies used by IMS for controlling the multimedia sessions combining voice and data streams.

A further core component of the IMS network architecture is the Service Capability Interaction Manager (SCIM) which was introduced in the 3GPP TS 23.002 standard as a function within a SIP Application Server domain of the IMS architecture. The role of the SCIM is that of a service broker in more complex service interaction scenarios which cannot be supported through the service filtering mechanism. The SCIM as proposed to the 3GPP uses an ISC interface to enable composite service behavior leveraging simpler service capabilities. In practical terms, a "capability" is a system component that may be used, presumably with other components, to implement a "service" that is packaged and delivered to end users of the network. For example, a group list server and a presence server may both be considered "capabilities" that are used to implement a sophisticated conferencing service. In this regard, an open issue in the 3GPP Release 9 specification is the orchestration of interaction between "capabilities" in the larger network which are represented as SIP Application Server instances. SCIM can be implemented using a service composition approach, where services, also called constituent services, may be aggregated to composite services. Composite services address complex user requirements that usually can not be covered by existing services. Hence, composite services offer added value in the form of new functionality compared to the sum of the functionality of their building blocks.

The service composition functionality usually introduces an entity—the service composition engine—that takes care of this complexity for the application. In this scenario the application implements just its core logic, whereas the enabling functionality, for example a "location-based weather forecast", is exposed by the composition engine as a single service that may be easily discovered and bound by the application. In this case, the composition engine executes application logic in the form of the definition of the composite service, e.g. in this case the composite service "location-based weather forecast". This composite service describes the type of required services, so that the engine—in particular at run-time—may discover, bind and execute appropriate services. Composition functionality, consequently, allows for great flexibility e.g. in handling events such as a faulty enabler. In this case, the engine could bind an alternative service without any disruption of the end-user application.

Composition sessions when executing composite services may contain session data. The session data are usually manipulated by the process according to instruction in its composite service description, i.e. as intended by a composite service designer. The data is either directly manipulated by these instructions, e.g. assigning a value to a variable, or indirectly, e.g. as results of services' invocations. Sometimes, this kind of composition session state data is also called "Shared State Data", because they represent the state shared between all services participating in a given composition session.

If the composition session is performed on several nodes in a communication network, then an implementation of the composition engine performs a complete composition state replication to all nodes running the composition engine in the cluster or cloud. However, the performance of such an replication approach may not be optimal, as under load a lot of data has to be replicated which may lead to a performance degradation due to the usage of resources such as memory or network bandwidth overheads. Moreover, in geographically distributed configurations, where composition engines are running in different countries or even continents, e.g. at different subsidiaries of an operator, the exchange of huge data amounts over non-local networks may become a bottleneck reducing the performance of a composition engine.

Accordingly, there is a need for efficiently managing an execution of a composite service, in particular when session data is to be provided to service execution nodes, e.g. composition engines, arranged in a communication network.

SUMMARY OF THE INVENTION

The invention is based on the finding that a composite service may efficiently be executed in a communication network when session data of a resulting composite service session is, in the communication network, migrated closer to services represented by the constituent services of the composite service, or closer to session nodes such as composition engines or composition execution agents which are likely to use at least a subset of the session data at a certain execution state of the composite service session.

According to an aspect, the invention relates to a method for managing session data of a composite service session in a communication network, the composite service session originating from executing a composite service which may comprise constituent services. Preferably, the method comprises determining a subset of the session data which will likely be used for executing the composite service at a certain execution state of the composite service session, and transmitting the subset of the session data over the communication network towards a certain session node which is involved or which is likely to be involved in executing the composite service at the certain execution state.

By way of example, the certain execution state may be determined by a certain process state at which e.g. at least one certain constituent service or a number of constituent services of the composite service is executed. However, the certain execution state may be determined by a certain session time instant.

As the execution state of the composite service session may be run-time dependant due to service branches or constraints, it may be difficult to determine a-priori which subset of the session data may be required at the certain execution state. Therefore, a probabilistic approach is used in order to determine the subset of the session data will likely, i.e. probably, be used for execution the composite service at the certain execution state. Conversely, another subset of the session data which will unlikely be used, i.e. which probably will not be used, for executing the composite service will neither be determined nor selected nor transmitted towards the certain session node.

In order to determine which subset of the session data, i.e. which composition session state data or shared state data, is likely to be used by which constituent service of the composite service and when, i.e. at which time instant, composite service information which may represent side information relating to the composite service may be exploited. Such composite session information may correspond to the skeleton as described in the documents WO 2008/119364 A1 and EP 1 978 758 A1, which are herewith incorporated herein by reference. The composite service information may, by way of example, indicate a structure of the composite service, the constituent services making up the composite service or session information, e.g. a workflow, relating to the execution of the composite service.

The determined subset of the session data may be replicated or migrated towards the certain session node and/or towards other nodes where constituent services are deployed and executed which are likely to be involved in the composite service session and are about to use the certain execution state. The certain session node may be a composition engine or a composition engine agent or a computing node in a distributed computing scenario. Furthermore, the time instant for performing the replication or migration may automatically be scheduled in order to optimize the overall performance of the composite service session. Thus, if there are multiple replicas of the same subset of the session data of the composition session state, then the session state may, according to some implementations, be kept coherent. Moreover, the replication overhead may be reduced as knowledge about the current composite service session and a structure of e.g. the above mentioned skeleton may be used to replicate only that subset of the session data which appears necessary for executing the certain session state. As the composition session state data is migrated or pre-fetched in advance, the composite service session latency may be reduced.

According to an embodiment, the session data will likely be used by the composite service at the certain execution state of the composite service session if a probability that the subset of the session data will be used by the composite service at the certain execution state is greater than a probability that another subset of the session data will be used by the composite service at the certain execution state. Both probabilities may be determined upon the basis of an analysis of the above mentioned composite session information or skeleton which allows at least roughly determining which data is more likely to be used by the composite service session than another data.

According to an embodiment, the method may comprise determining a certain time instant at which the composite service will likely be executed at the certain execution state, and transmitting the subset of the session data towards the certain session node prior to executing the composite service at the certain time instant. The certain time instant may be determined upon the basis of the above mentioned composite session information.

According to an embodiment, the method may comprise determining a further subset of the session data which will likely be used for executing the composite service at a further execution state of the composite service session, and transmitting the further subset of the session data over the communication network towards the session node or towards a further session node, the session node or the further session node being involved in executing the composite service at the further execution state. The further subset of the session data may be used by e.g. further constituent services of the composite service, wherein an execution of these services may determine the further execution state. The further subset of the session data may be determined in accordance with the principles of determining the subset of the session data. Hence, it is possible that different subsets of the session data of the same composite service session are provided to different session nodes which are involved in the execution of the composite service session.

According to an embodiment, the method may further comprise retrieving information identifying the certain session node from a session data base. The session data base may be accessible via a communication network and may comprise e.g. a network others and/or further information relating to the certain session node.

According to an embodiment, the subset of the session data and/or the further subset of the session data and/or the certain constituent service and/or a certain time instant at which the composite service will be executed at the certain execution state may be determined from composite service information which may indicate at least one of: a structure of the composite service and/or the constituent services of the composite service and/or session information such as workflow relating to the execution of the composite service. The composite service information may be formed by the aforementioned skeleton and may comprise further information relating to e.g. conditional elements or execution branches.

According to an embodiment, the subset of the session data and/or the further subset of the session data and/or a constituent service of the composite service and/or a certain session time instant at which the composite service will be executed at the certain execution state may be determined upon the basis of at least one further constituent service being designated or selected for execution during the composite service session. In other words, the execution of the further constituent service may at least roughly determine which subset of the session data will likely be used for executing the composite service at the certain execution state.

According to an embodiment, the subset of the session data is transmitted towards the certain session node by a current session node which is involved in a current execution of the composite service session. By way of example, the current session node may determine whether the subset of the session data is likely to be used by the certain session node at the certain execution state. Thus, the current session node may decide whether to forward the certain subset of the session data towards the certain session node. Furthermore, the current session node may transmit, together with the subset of the session data, session information, e.g. a workflow, enabling the certain session node to execute the composite session.

According to an embodiment, the method may comprise determining, e.g. statically or dynamically, a plurality of network complexity measures such as network loads or latencies indicating network complexities when transmitting the subset of the session data at different time instants towards the certain session node. The network complexities may e.g. determine network costs indicating the effort which is necessary to transmit the subset of the session data at the respective time instant towards the certain session node. Further, the method may comprise transmitting the subset of the session data towards the certain session node at the time instant which is associated with the least network complexity measure from the plurality of network complexity measures. The method may further comprise selecting the time instant which is associated with the least complexity among a plurality of possible time instants.

According to an embodiment, the method may comprise determining, e.g. statically or dynamically, a plurality of network complexity measures such as e.g. network loads or latencies indicating network complexities when different session nodes are involved in executing the composite session, and selecting the certain session node, the certain session node being associated with the least network complexity measure from the plurality of network complexity measures. Thus, the certain session node is the selected session node from e.g. a plurality of session nodes which is associated with e.g. the least expected network costs emerging when executing the composite service at the certain execution state. The subset of the session data may be transmitted towards the session node which appears more advantageous for executing the composite session than any other session node.

According to an embodiment, the method may comprise determining a plurality of network complexity measures upon the basis of static information which may comprise at least one of: a composite service template and/or a service description and/or a service location. Thus, the static information may be constant over time.

According to an embodiment, the method may comprise determining a plurality of network complexity measures, e.g. the network complexity measures mentioned above, upon the basis of dynamic information which may comprise at least one of: composite session data and/or statistical records about service execution and/or a network load and/or a latency between network or session nodes and/or a result of at least one previous execution of the composite session. Thus, the dynamic information may vary over time.

According to an embodiment; the method may comprise selecting the certain session node for executing the composite service at a further session execution state which will likely require the subset of the session data, and initiating the execution of the composite service at the further session execution state by the certain session node by e.g. transmitting an execution request towards the certain session node. Therefore, the network complexity may a-priori be reduced since a repeated transmission of the subset of the session data may be avoided if the certain session node also executes e.g. further constituent services which are likely to require the subset of the session data.

According to an embodiment, the method may comprise determining a further session node being involved in executing the composite service at a further execution state which will likely require the subset of the session data, and initiating a transmission of the subset of the session data and/or transmitting the subset of the session data from the certain session node towards the further session node. To initiate the transmission of the subset of the session data, a transmission request may be provided to the certain session node by e.g. another session node of by a composite service agent.

According to an embodiment, the method may comprise forwarding the subset of the session data by the certain session node towards a further session node which is likely to execute the composite service at the further execution state of the composite service session. Thus, the certain session node may control the distribution of at least the subset of the session data.

According to an embodiment, the method may comprise executing the composite service at the certain execution state of the composite service session by the certain session node. Correspondingly, the method may comprise transmitting an execution request towards the certain session node to initiate the execution of the composite service.

According to an embodiment, the composite service may be at least one of: Internet Protocol Multimedia Subsystem (IMS) composite service and/or an instance of a Business Process Execution Language (BPEL) process and/or an instance of a Business Process Modeling Language (BPML) process and/or an instance of an Enterprise Service Bus (ESB) composite service.

Some aspects of the invention relate to the replication and migration of composition session data from one node to at least one other node that is able to execute compositions or requires access composition session data or may provide access to composition session data, where, by way of example, only a subset of composition session data may be replicated/migrated. Furthermore, a decision about the subset of data to replicate/migrate may be based on the analysis of composition session data and/or composition session execution statistics and/or compositions usage statistics and/or resource usage statistics and/or data access requirements and/or real and estimated data access statistics of constituent services and/or estimates and state of a run-time environment. Furthermore, a decision about the nodes to replicate/migrate to may be based on the analysis of composition session data and/or composition session execution statistics and/or compositions usage statistics and/or resource usage statistics and/or data access requirements and/or real and estimated data access statistics of constituent services and/or estimates and state of a run-time environment. In addition, the decision about when to replicate/migrate the data may based on the analysis of composition session data and/or composition session execution statistics and/or compositions usage statistics and/or resource usage statistics and/or data access requirements and/or real and estimated data access statistics of constituent services and/or estimates and state of a run-time environment. Further, decisions may also take information about geographical distribution of services participating in composition session, nodes participating in composition and their interconnections into account, e.g. the network topologies. Moreover, decisions may also take information about current network resources utilization and estimated network resources utilization in case of replicated and non-replicated composition session data into account. According to some embodiments, decisions may be taken in such a way that they minimize the cost estimates for composition session data replication/migration are minimized. Furthermore, a replication decisions for multiple subsets of data are aggregated and performed at once.

Some aspects of the invention relate to the selection of service implementation according to service templates, where a decision about a concrete service implementation to be used is trying to minimize the overall cost of data replication/migration for a given composition session and may be based on: an analysis of composition session data, composition session execution statistics, compositions usage statistics, resource usage statistics, data access requirements, real and estimated data access statistics of constituent services, and estimates and state of a run-time environment, geographical distribution of services participating in composition session, nodes participating in composition and their interconnections, e.g. network topology, information about current network resources utilization and estimated network resources utilization in case of replicated and non-replicated composition session data.

According to a further aspect, the invention relates to a session node for managing session data of a composite service session in a communication network, the composite service session originating when executing the composite service. Preferably, the session node comprises a data determiner for determining a subset of the session data which will likely be used for executing the composite service at a certain execution state of the composite service session, and a transmitter for transmitting the subset of the session data over the communication network towards a certain session node being involved in executing the composite service at the certain execution state.

According to an embodiment, the session node may be at least one of: a composition execution agent being adopted to operate according to the IMS technology, or a composite service engine being adopted to operate according to the IMS technology, or a computing node in a distributed computing network, in particular in a cloud computing network or in an ESB environment.

According to a further aspect, the invention relates to a computer program with a program code for performing the method for managing session data of a composite service session when the computer program is executed on a computer.

Further functionality of the session node is directly derivable from the features of the method steps of the method for managing session data of a composite service session.

According to a further aspect, the invention relates to a programmably arranged network entity being configured to execute the above mentioned computer program for performing the method for managing session data of a composite service session.

It is to be understood that the invention does not only relate to composition engines. Rather, the invention also relates to all composition technologies such as (clustered) BPEL engines and BPM (Business Process Management) engines. Thus, the term "composition session" may also refer to a "BPEL process" and the terms "application skeleton" and "composition description" may also refer to a "BPEL script".

BRIEF DESCRIPTION OF THE DRAWINGS

Further embodiments will be described with reference to the following figures, in which.

DETAILED DESCRIPTION

Before embodiments of the invention are described in detail, it is to be understood that this invention is not limited to the particular component parts of the devices described or steps of the methods described as such devices and methods may vary. It is also to be understood that the terminology used herein is for purposes of describing particular embodiments only, and is not intended to be limiting. It must be noted that, as used in the specification and the appended claims, the singular forms "a," "an" and "the" include singular and/or plural referents unless the context clearly dictates otherwise.

Figure 1:
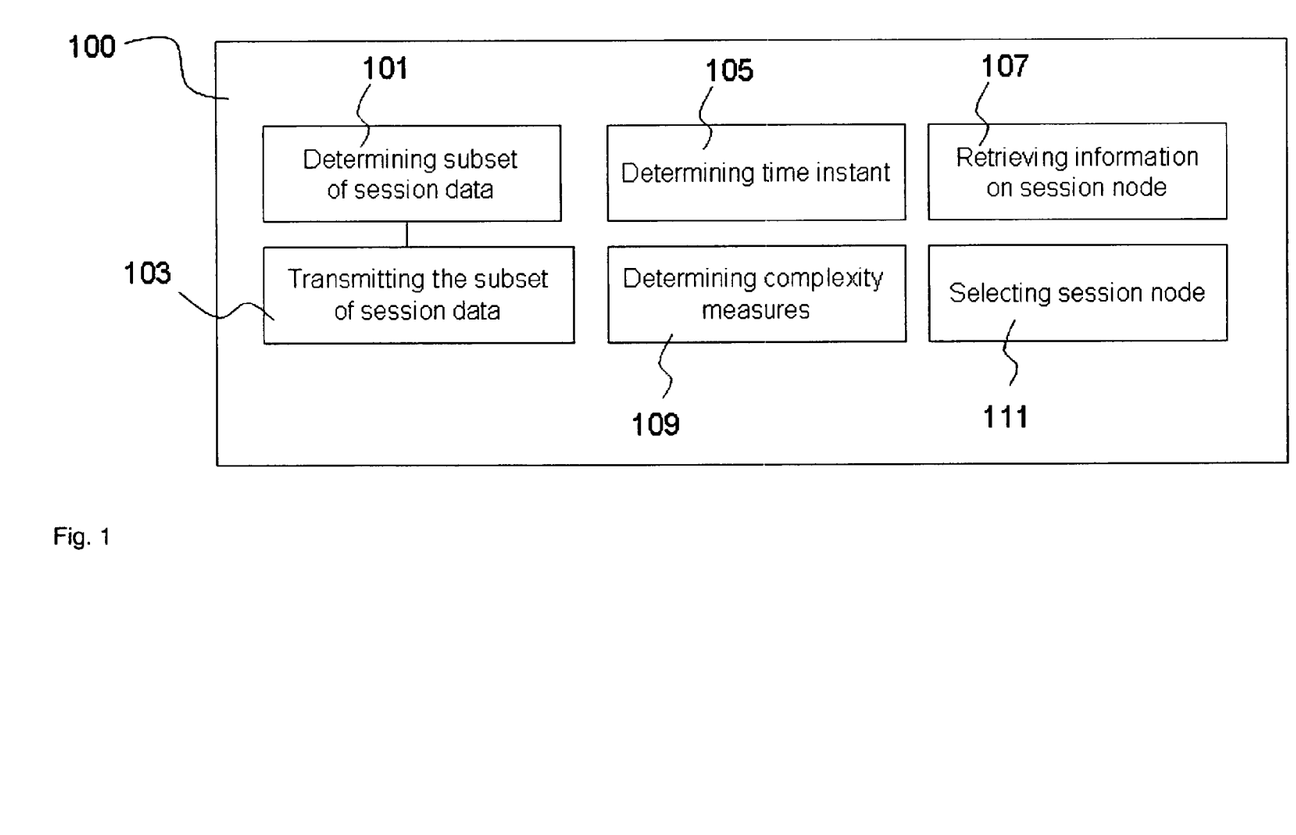
FIG. 1 shows a diagram of a method for managing session data of a composite service session according to an embodiment.

FIG. 1 shows a diagram of a method 100 for managing session data of a composite service session comprising determining 101 a subset of the session data which will likely be used for executing the composite service at a certain execution state of the composite service session, and transmitting 103 the subset of the session data over the communication network towards a certain session node (not depicted in FIG. 1), which is involved in executing the composite service at the certain execution state. Optionally, the method may comprise determining 105 a certain time instant at which the composite service will likely be executed at the certain execution state, wherein the subset of the session data is transmitted in the step of transmitting 103 towards the certain session node prior to executing the composite service. In order to determine e.g. a network address of the certain session node, the method may further comprise retrieving 107 information identifying the certain session node.

According to some implementations, the method may further comprise determining 109, e.g. statically or dynamically, a plurality of network complexity measures such as network loads or latencies indicating network complexities when transmitting the subset of the session data at different time instants or towards different session nodes. The step of determining 109 may further comprise analyzing the network complexities or extracting the network complexities or minimizing a complexity function, e.g. a cost function, in order to determine the least network complexity measure.

Optionally, the method may comprise selecting 111 the certain session node for executing the composite service at a further session execution state, and, e.g. in the step of selecting 111, initiating the execution of the composite service at the further session execution state by the certain session node. Furthermore, the method may comprise executing the composite service at the certain execution state by the certain session node.

Figure 2:
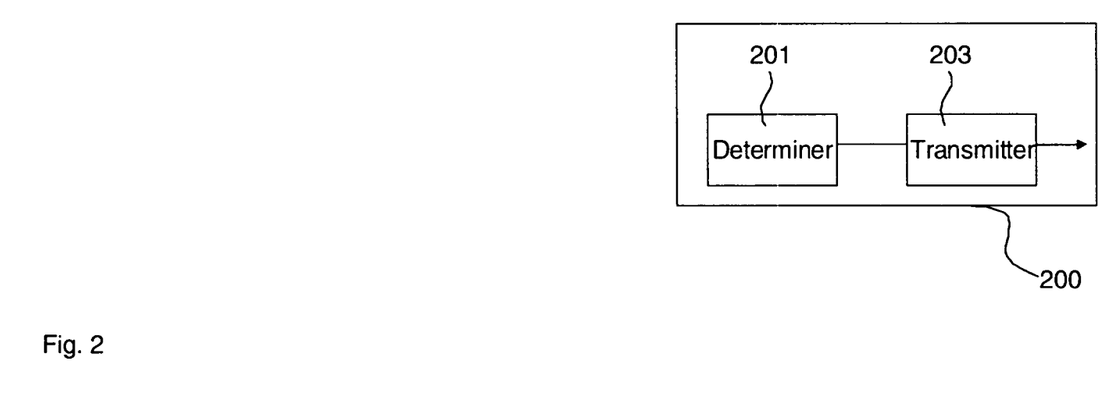
FIG. 2 shows a diagram of a session node for managing session data of a composite service session according to an embodiment.

FIG. 2 shows a block diagram of a corresponding session node 200 comprising a data determiner 201 for determining the subset of the session data which will likely be used for executing the composite service at the certain execution state of the composite service station, and a transmitter 203 for transmitting the subset of the session data towards the certain session node over a communication network. The transmitter may be a transmitter operating according to any known wireless or wired communication technology.

Optionally, composition session data monitor may be provided which is configured to keep track of information required for the composition session data analysis, i.e. for determining the subset of the session data. Furthermore, a composition session data location tracker may be provided which may, by way of example, maintain information relating to e.g. a set of session nodes towards which the session data was already replicated or when the replication took place.

Furthermore, an analysis entity may be provided in order to e.g. analyze a service skeleton as described in the following. Furthermore, a data replication/migration decision entity may be provided which takes into account the results of the analysis performed by the analysis entity, which may perform network complexity measure estimates and which may decide about which subset of data is to be transmitted, e.g. replicated or migrated, towards which session node. Furthermore, a data replication/migration time scheduling entity may be provided which may try to schedule the set of replication/migration tasks representing the decisions made by the data replication or migration decision making entity such that the overall costs, e.g. a network load or a resource consumption, are minimized when performing the set of replication tasks. Furthermore, a data replication entity may be provided which executes the decisions of the data replication/migration entity.

In order to determine the subset of the session data or a constituent service of the composite service or a certain time instant at which to transmit the subset of the session data, a service skeleton described in the following may be analyzed. In particular, by e.g. analyzing the skeletons and service descriptions, information about the data access pattern resulting during composition session may at least be estimated.

Application skeletons as e.g. disclosed in the WO 2008/119364 A1 and in the EP 1 978 758 A1 may implement a composite service by defining the set of participating services, the structure of the composition, i.e. how individual services should be connected in order to form a composite service, and the control flow, i.e. in which order the individual services will be executed. In order to specify a service to be used as a component of composite services, the application skeleton may define a service template. This service template is a placeholder for a constituent service and describes the service to be used by means of abstract properties rather than by pointing to a concrete service deployment. Therefore, these properties constitute requirements on the service to be selected at run-time. They are therefore referred to as constraints of the service selection. For example, the constraint (function='positioning')&(min_accuracy='0.1 km')

will select a service that provides the position of a mobile subscriber. It also specifies that only positioning services with a minimum accuracy of 100 m shall be considered.

According to some implementations, an application skeleton may go beyond a simple chain of service templates defining the set and order of constituent service invocations. In addition, conditional branches in the skeleton flow can be defined, which results in alternative behavior of the composite service. The related branching conditions can for example evaluate the results of previously executed services.

Due to the abstract descriptions of the constituent services to be used within a service template, the application skeleton constitutes an abstract model of the composite service. Concrete services are selected according to the constraints at execution time rater than at design time. This characteristic is referred to as late-binding. The advantage of this approach is that a composite service can be designed without knowing the exact set of available constituent services. Furthermore, constituent services can be replaced by any compatible service without changing the composite service.

By way of example, an application skeleton forming an embodiment of the composite service information may comprise 4 elements: a start element, a service template, a conditional statement, and an end element. Service templates and conditional statement are particular interesting for the selection of the composition node, because they have a direct impact on the resulted list of services. Other service composition approaches may have corresponding elements in their languages, e.g. may invoke "and-if" elements in BPEL or "action and switch" elements in BPML. Hence, the approach disclosed herein may also be applied to other service composition approaches.

With regard to the service composition, skeletons may also be used to describe the application logic. Further examples for application logic description languages are Business Process Execution Language (BPEL) or Business Process Modeling Language (BPML). Such descriptions languages describe how to compose the application in a way similar to a program code that describes what should be done to achieve a certain result. An instance of a composition is typically created at run-time from such descriptions. In this sense, it is similar to how a new process is created by an operating system when it tries to execute the program that is saved on disk. Such an instance of the composition, a "process", is called composition session. Some other technologies, e.g. like BPEL and BPML, tend to call it BPEL process.

According to some implementations, also service templates, which are placeholders for a service, may be pre-evaluated in order to e.g. determine which subset of the session data shall be migrated. A service template contains an expression that describes which service should be executed. The composition engine evaluates this expression at run-time against the service repository and the run-time state. The results of the evaluation of a service template are one or more services, which may be considered as being equivalent so that any of these services can executed. In the next step, the composition engine may execute one of these equivalent services. The pre-evaluation of the service templates means that expressions of all service templates of an application skeleton will be evaluated against the current service repository and the current run-time state. In contrast to the execution of the application skeleton, the services will not be executed during the pre-evaluation. Information about the service's costs to all composition nodes is used in order to select the composition node with the minimum costs impact, i.e. with the minimum impact on the complexity measures. Further optimization dimension is to recommend a specific service out of equivalent services that would lead to the minimum network related costs. Later, at skeleton's execution phase, this recommendation may consider further selection criteria such as user/operators preferences, server load, etc.

Figure 3:
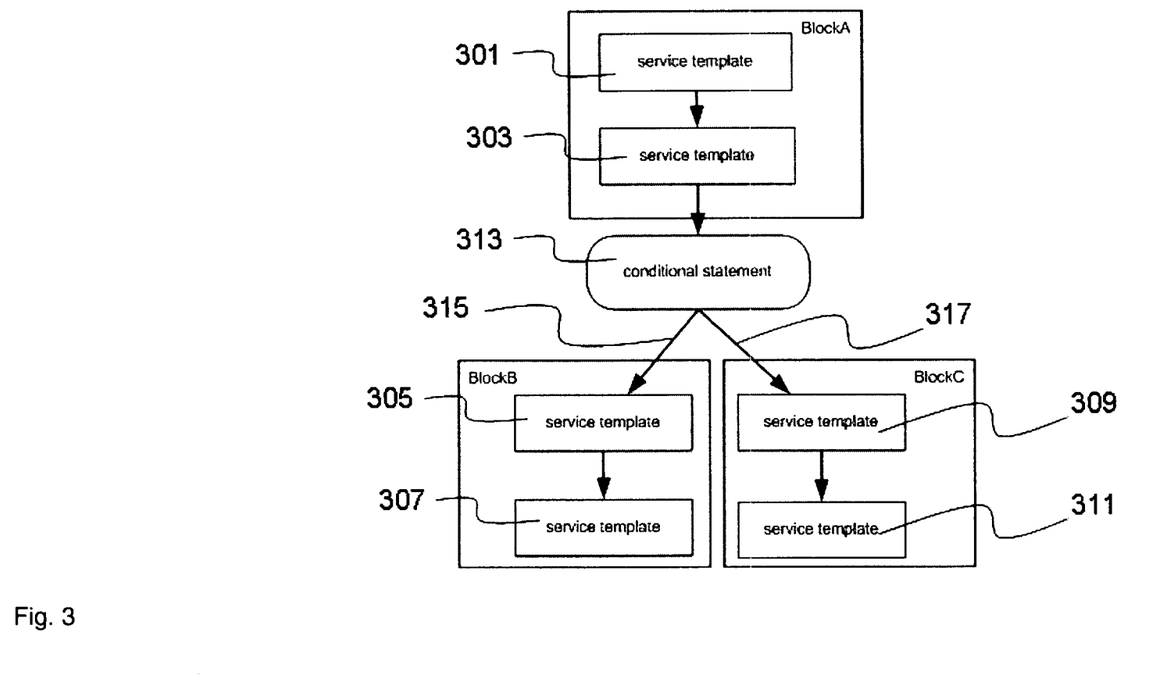
FIG. 3 shows an application skeleton with a conditional element according to an embodiment.

FIG. 3 depicts, by way of example, an application skeleton comprising service templates 301 and 303 arranged within a block A, service templates 305 and 307 arranged within a block B and service templates 309 and 311 arranged within a block C. Furthermore, a conditional statement 313 with two branches 315 and 317 is provided, the branches 315, 317 respectively guiding towards block B or block C. While, by way of example, the service templates 301 and 303 in block A may always be executed, the execution of templates 305, 307 in block B and templates 309 and 311 in block C may depend on the results of the evaluation of the conditional statement 313. Thus, depending on the result of the conditional statement 413, either service templates 305, 307 of block B or service templates 309, 311 of block C will be executed.

Figure 4:
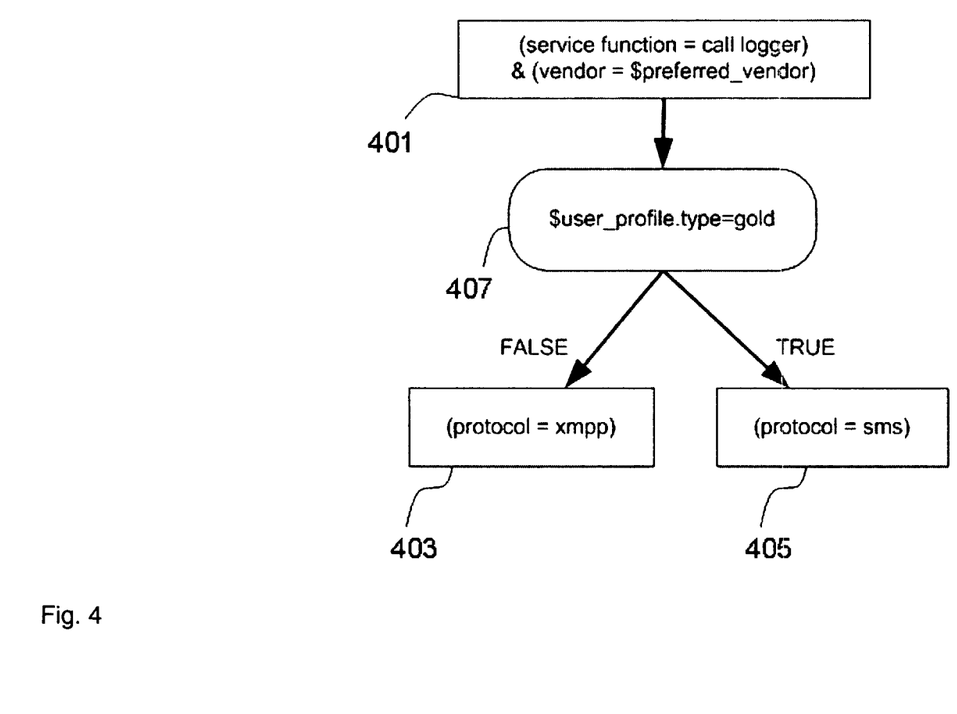
FIG. 4 shows an application skeleton according to an embodiment.

FIG. 4 demonstrates a service description using a skeleton which depends on a run-time state. The skeleton comprises 3 service templates 401, 403, 405, and a conditional statement 407, where, depending on a result of the conditional statement, the service template 403 with constraints (protocol=xmpp) or the service template 405 with constraints (protocol=sms) will be evaluated.

Typically, the result of a conditional statement depends on the run-time state or on the results of the services executed before. Thus, conditional statements cannot be pre-evaluated and in general all branches with their services may be equiprobable. Therefore, all services in all branches may be considered during the selection of the composition engine node. In order to express probability of services, their network related costs can be weighted accordingly. By way of example, the costs for services of the block A may be weighted with 1 and costs for services of block B and block C may be weighted with ½.

Generally, a certain estimate based on a static or dynamic branch probability prediction analysis may be performed upon a basis of e.g. a program optimization area where either static estimates or profile-based optimization based on the dynamic statistics collection approach may be performed. If e.g. collected dynamic statistics about execution of the same composite service by different composition sessions are available then they may be used to derive a more precise probability of branches. The dynamic statistics my be used to derive information on e.g. how many times a given condition was evaluated and on how many times a certain outcome/ branch was taken. With this information, the probability of branches may be estimated e.g. according to the following formula:

$$\text{number\_of\_times\_a\_given\_branch\_was\_taken} / \text{numer\_of\_times\_condition\_was\_evaluated}.$$

An analysis of the composite session upon the basis of the skeleton may comprise analyzing the structure of the skeletons and determining which composition session data is used during composition session execution in order to e.g. determine:
- what data is required during composition session execution, and/or
- when a given subset of data is supposed to be accessed during the composition session execution, and/or
- what constituent services or other entities are supposed to access a given subset of data at a given time, and/or
- information about locations in the network of constituent services or other entities which are supposed to access a given subset of data at a given time.

This analysis may be pessimistic: if no information about a given criterion can be derived from the composition description, then the worst case may be assumed. By way of example, if no information is known about constituent services that are supposed to access a given subset of data, then the analysis would assume that any service can access this data. Further, if no information is known about the time, where a given subset of data is supposed to be accessed, then it may be assumed that the access may follow anytime.

The skeleton analysis may further use the following information as input:
- descriptions of composition steps, in particular those ones that explicitly access composition session data, e.g. shared state manipulation, evaluation expressions, etc., and/or
- formal descriptions of constituent services from the service data-base, in particular descriptions of data that such a service may access, and/or
- dynamic access to the composition session data by constituent services at run-time via e.g. APIs provided for this purpose. This kind of information is the most dynamic one and can be obtained only at run-time, as a static analysis, i.e. ahead-of-time analysis, is difficult to perform.

Based on the information collected by the skeleton analysis, further information indicating e.g. a subset of the session data which is supposed to be accessed by given nodes may be derived. These nodes may be different and distributed over multiple locations. Therefore, only replications of data to those nodes may be performed as other nodes do not need this data anyway. Furthermore, the subset of the session data cannot be accessed after a certain point in composition execution (based on a 'liveness' analysis) may be identified. Therefore there is not need to replicate it after this moment.

According to some embodiments, also an analysis of composition session data may be performed. By way of example, during run-time, a composition engine forming an embodiment of a session node may collect statistics about the composition session data such as a type of a the subset of the session data, a size of the subset of the session data, which constituent services are accessing the subset of the session data, which composition steps explicitly access the subset of the session data, when the subset of the session data is accessed, how often the subset of the session data is accessed, which access mode (read or write) is used for the subset of the session data by a given composition step or a given constituent service, how much information was transferred from current node to different nodes and/or how expensive, e.g. in terms of time, bandwidth or latency, was the transfer of the subset of the session data from current node to different nodes.

Based on this information, a "weight" metric can be computed for each data element or for each subset of data. In principle, this weight should reflect how expensive it is to replicate/migrate this data. For example, a very big data or data accessed by very many services may be provided with a higher weight than other data.

According to some embodiments, an analysis of the constituent services participating in a composition session may be performed upon the basis of the skeleton. Such analysis may analyze the description of a composition and figure out based on analysis of service templates (components that describe in a declarative way (e.g. by means of constraints) which constituent services are likely to be required for the composition), what are the potential services that will be used by the composition. This can be achieved by e.g. evaluating the constraints against the current state of the service database and obtaining as a result the set of matching constituent services. This analysis can be performed statically, even before the composition session starts which assumes that the content of the service database does not change before or during composition session, as it may change the results of analysis. Alternatively or additionally, this analysis can be performed at runt-time of a composition session. In this case, it may additionally use the information about concrete constituent services already selected for execution in scope of this composition session may be used.

According to some embodiments, an analysis of distributed nodes participating in a composition session may be performed, Based on the analysis of constituent services participating in a composition session, a service database (service registry) may be consulted to figure out where (on which node(s)) each of those constituent services is being executed. In particular, this analysis enables detecting co-located services. This is useful, as data exchange between co-located services is usually much cheaper than between distributed services. This information can be used for optimizing data replication and service selection processes.

According to some embodiments, time-based information may be derived from the analysis based on the composition description and on the data-access analysis. By way of example, if a certain subset of the session data is accessed from now on only by the node where current system is running, then there is no need to replicate/migrate it from now on. However, if the certain subset of the session data is not accessed from now on by any service, then there is no need to keep it. It can be removed. In addition, if a certain subset of the session data is accessed from now on only by services on a given node, then it is probably better to migrate it to that node and remove it from the current node.

According to some embodiments, network complexity measures, e.g. cost estimates, may be determined by taking e.g. into account:
- an analysis of composition session data (e.g. weight of data), and/or
- an analysis of constituent services participating in a composition session; and/or
- an analysis of distributed nodes participating in a composition session.

Thus, the costs, i.e. the complexity measures, for placing data at different nodes may be estimated, whereby different alternatives may be considered. The goal is to minimize the costs according to a certain metric representing e.g. time, amount of traffic, etc. Additionally, based on the results of such analysis, the method or the system or any node may try to estimate the costs for selecting different service implementations for those service templates, where multiple different service implementations matching exist. For example, by selecting a service implementation that is deployed on the same node as some other services participating in the composition session, the system may reduce the overall estimated cost, as there is no need for an expensive data replication between this service and other services deployed on the same node.

According to some embodiments referring to the data replication or migration, after a solution leading to the cost minimum, i.e. to the complexity measure minimum, has been found, data replication or data migration may be performed according to the principles described herein. If some of the conditions change, then the system may need to re-compute the estimates to find an eventually different solution. Examples of changes are: updates of data (all replicas of this data should be updated eventually, if it cannot be proven that this data will not be accessed any more), changes of the service database (new servicing nodes, removal of services, changes of service availability information) or significant changes in data access statistics (e.g. based on dynamic statistics or on static analysis). If a new solution is found, then it may lead to re-scheduling of a data-replication process.

According to some embodiments referring to the time instant of replication/migration, in addition to deciding what should be replicated and where are the nodes to replicate/migrate to, then it may be figured out, when, i.e. at which time instant, such replication may be performed. In some situations, e.g. when the shared state data has changed, it is obvious that replication may be performed at the latest when there is an attempt to access this data on a different node. But this can be already too late, because it would mean that the other node has to wait until it gets the data, thus the latency is increased. Therefore, it could be interesting to perform data replication/migration ahead-of-time. It means that replication/migration is performed at a certain time after the data is changed by the current node, but before it is needs to be accessed by another node. This can be viewed as a certain kind of pre-fetching. If data has been already replicated to the remote node by the time when the remote node needs to access it, then no additional latency is introduced for this access, as the data are already on the required node. To figure out the time instant for performing the replication, the following information may be used: earliest and latest points in time and/or when data replication may be performed and/or results of composition session data analysis, especially the how much information was transferred from current node to different nodes and/or how expensive (time, bandwidth, latency, etc) was the transfer from current node to different nodes, information about other pending replication/migration tasks.

In addition information about all pending replication/migration tasks including their deadlines, may be collected, estimates for the expected duration of replication/migration may be created, the tasks may be scheduled in such a way that all deadlines are fulfilled and the load on the current node (source of replication) and destination nodes is minimized (e.g. by executing replications tasks sequentially or by limiting the amount of replication tasks performed at once).

According to some embodiments relating to the data aggregate replication/migration, a method of replication/migration does the replication for each subset of the composition session state data independently (e.g. on demand). Further, the system may try to aggregate multiple replication/migration tasks together, if they have the same source and destination node parameters. In this case, the whole replication/migration may proceed in one go by using e.g. only one connection and less processing resources.

A particular embodiment refers to a system, either a distributed or a centralized system, for managing session data of a composite service session. The system is adapted to perform the described method.

The invention claimed is:

1. A method for managing session data of a composite service session in a communication network, the composite service session originating from executing a composite service, the method comprising:
   determining a first probability that the composite service will be in a certain execution state;
   in response to the first probability being above a first threshold:
      identifying a subset of the session data, the session data representing a state shared between constituent services of the composite service session, and the subset being used by a certain session node during execution of the composite service when in the certain execution state;
      transmitting the subset of the session data over the communication network towards the certain session node.

2. The method of claim 1, wherein the first threshold is a second probability that the composite service will be in a different execution state that is distinct from the certain execution state.

3. The method of claim 1 further comprising:
   determining a certain time instant corresponding to executing the composite service at the certain execution state; and
   transmitting the subset of the session data towards the certain session node prior to the certain time instant.

4. The method of claim 1 further comprising:
   determining a third probability that the composite service will be in a further execution state;
   in response to the third probability being above a second threshold:
      identifying a further subset of the session data used by the certain session node or a further session node during execution of the composite service when in the further execution state;
      transmitting the further subset of the session data over the communication network towards the certain session node or towards the further session node.

5. The method of claim 1 further comprising:
   determining a fourth probability that the composite service will be in a further execution state;
   in response to the fourth probability being above a third threshold:
      identifying a further subset of the session data used by the certain session node during execution of the composite service when in the further execution state;
      transmitting the further subset of the session data together with the subset of the session data over the communication network towards the certain session node.

6. The method of claim 1 further comprising retrieving information identifying the certain session node from a session data base.

7. The method of claim 1 wherein the subset of the session data, or a constituent service, or a certain time instant corresponding to the execution of the composite service at the certain execution state is determined from composite service information indicating at least one of:

structure of the composite service;
constituent services of the composite service; and
session information relating to the execution of the composite service.

8. The method of claim 1 wherein the subset of the session data, or a constituent service, or a certain session time instant corresponding to the execution of the composite service at the certain execution state is determined based on at least one further constituent service being designated or selected for execution during the composite service session.

9. The method of claim 1 wherein the subset of the session data is transmitted towards the certain session node by a current session node involved in a current execution of the composite service session.

10. The method of claim 1 further comprising:
determining a plurality of network complexity measures indicating network complexities when transmitting the subset of the session data at different time instants towards the certain session node; and
transmitting the subset of the session data towards the certain session node at the time instant which is associated with the least network complexity measure from the plurality of network complexity measures.

11. The method of claim 1 further comprising:
determining a plurality of network complexity measures indicating network complexities when different session nodes are involved in executing the composite session; and
selecting the certain session node, the certain session node corresponding with the least network complexity measure from the plurality of network complexity measures.

12. The method of claim 1 further comprising determining a plurality of network complexity measures upon the basis of static information, the static information comprising at least one of:
a composite service template;
a service description; and
a service location.

13. The method of claim 1 further comprising determining a plurality of network complexity measures upon the basis of dynamic information, the static information comprising at least one of
composite session data;
statistical records about service execution;
a network load;
a latency between network or session nodes; and
a result of at least one previous execution of the composite session.

14. The method of claim 1 further comprising:
determining a fifth probability that the composite service will be in a further execution state;
in response to the fifth probability being above a fourth threshold:
selecting the certain session node for executing the composite service at a further session execution state;
initiating the execution of the composite service at the further session execution state by the certain session node.

15. The method of claim 1, further comprising:
determining a sixth probability that a further session node will be involved in executing the composite service in a further execution state;
in response to the sixth probability being above a fifth threshold, initiating a transmission of the subset of the session data from the certain session node towards the further session node.

16. The method of claim 1, further comprising:
determining a seventh probability that a further session node will execute the composite service at the certain execution state;
in response to the seventh probability being above a sixth threshold, forwarding the subset of the session data by the certain session node towards the further session node.

17. The method of claim 1, wherein the subset of the session data is transmitted towards the certain session node by a further session node which is not involved in executing the composite service at the certain execution state of the composite service session.

18. The method of claim 1, further comprising executing the composite service at the certain execution state of the composite service session by the certain session node.

19. The method of claim 1, wherein the composite service is at least one of:
an Internet Protocol Multimedia Subsystem (IMS) composite service;
an instance of a Business Process Execution Language (BPEL) process;
an instance of a Business Process Modeling Language (BPML) process; and
an instance of an Enterprise Service Bus (ESB) composite service.

20. A session node for managing session data of a composite service session in a communication network, the composite service session originating when executing the composite service, the session node comprising:
processing hardware configured to:
determine a probability that the composite service will be in a certain execution state;
in response to the probability being above a threshold, identify a subset of the session data, the session data representing a state shared between constituent services of the composite service session, and the subset being used by a certain session node during execution of the composite service when in the certain execution state;
a transmitter configured to transmit the identified subset of the session data over the communication network towards the certain session node.

21. The session node of claim 20, wherein the session node is a computing node, adopted to operate according to Internet Protocol Multimedia Subsystem technology, that comprises at least one of:
a composition execution agent;
a composite service engine.

22. A computer program product stored in a non-transitory computer readable medium for controlling a computer for managing session data of a composite service session in a communication network, the composite service session originating from executing a composite service, the computer program product comprising software instructions which, when run on the computer, causes the computer to:
determine a probability that the composite service will be in a certain execution state;
in response to the probability being above a threshold:
identify a subset of the session data, the session data representing a state shared between constituent services of the composite service session, and the subset being used by a certain session node during execution of the composite service when in the certain execution state;
transmit the subset of the session data over the communication network towards the certain session node.

23. A system for managing session data of a composite service session in a communication network, the composite service session originating from executing a composite service the system comprising:
- a computer;
- a first node operatively connected to the computer;
- the computer configured to:
  - determine a probability that the composite service will be in a certain execution state;
  - in response to the probability being above a threshold:
    - identify a subset of the session data, the session data representing a state shared between constituent services of the composite service session, and the subset being used by the first node during execution of the composite service when in the certain execution state;
  - transmit the subset of the session data over the communication network towards the first node.

* * * * *

UNITED STATES PATENT AND TRADEMARK OFFICE
CERTIFICATE OF CORRECTION

PATENT NO. : 8,966,094 B2  
APPLICATION NO. : 13/519646  
DATED : February 24, 2015  
INVENTOR(S) : Levenshteyn et al.

Page 1 of 2

It is certified that error appears in the above-identified patent and that said Letters Patent is hereby corrected as shown below:

In the specification

In Column 2, Lines 14-15, delete "an replication" and insert -- a replication --, therefor.

In Column 5, Line 31, delete "embodiment;" and insert -- embodiment, --, therefor.

In Column 10, Line 65, delete "my be" and insert -- may be --, therefor.

In Column 11, Line 6, delete "numer_" and insert -- number_ --, therefor.

In Column 11, Line 54, delete "is not" and insert -- is no --, therefor.

In Column 11, Line 59, delete "a the" and insert -- the --, therefor.

In the claims

In Column 14, Line 30, in Claim 3, delete "claim 1" and insert -- claim 1, --, therefor.

In Column 14, Line 36, in Claim 4, delete "claim 1" and insert -- claim 1, --, therefor.

In Column 14, Line 48, in Claim 5, delete "claim 1" and insert -- claim 1, --, therefor.

In Column 14, Line 60, in Claim 6, delete "claim 1" and insert -- claim 1, --, therefor.

In Column 14, Line 63, in Claim 7, delete "claim 1" and insert -- claim 1, --, therefor.

In Column 15, Line 5, in Claim 8, delete "claim 1" and insert -- claim 1, --, therefor.

In Column 15, Line 11, in Claim 9, delete "claim 1" and insert -- claim 1, --, therefor.

In Column 15, Line 16, in Claim 10, delete "claim 1" and insert -- claim 1, --, therefor.

In Column 15, Line 25, in Claim 11, delete "claim 1" and insert -- claim 1, --, therefor.

Signed and Sealed this  
Twenty-third Day of February, 2016

Michelle K. Lee  
*Director of the United States Patent and Trademark Office*

CERTIFICATE OF CORRECTION (continued)
U.S. Pat. No. 8,966,094 B2

In the claims

In Column 15, Line 33, in Claim 12, delete "claim 1" and insert -- claim 1, --, therefor.

In Column 15, Line 40, in Claim 13, delete "claim 1" and insert -- claim 1, --, therefor.

In Column 15, Line 43, in Claim 13, delete "one of" and insert -- one of: --, therefor.

In Column 15, Line 50, in Claim 14, delete "claim 1" and insert -- claim 1, --, therefor.